United States Patent [19]
Heider et al.

[11] Patent Number: 5,780,783
[45] Date of Patent: Jul. 14, 1998

[54] VEHICLE LOAD WEIGHING SYSTEM

[76] Inventors: Leon J. Heider, 1107 Third Ave., SW.; Merle J. Heider, 203 12th St., SW.; Dale J. Heider, 1108 8th Ave., SW.; Craig J. Heider, 812 S. Taft St., all of Humbolt, Iowa 50548; Lawrence H. Holten, W136 S6490 Sherwood Ct., Muskego, Wis. 53150; James R. Scholler, 19760 Timberline Dr., Brookfield, Wis. 53045

[21] Appl. No.: 531,230

[22] Filed: Sep. 19, 1995

[51] Int. Cl.⁶ .......................... G01G 19/10; G01G 19/08
[52] U.S. Cl. ................................ 177/137; 177/141
[58] Field of Search ......................... 177/25.14, 136, 177/137, 138, 139, 141

[56] References Cited

U.S. PATENT DOCUMENTS

| | | | |
|---|---|---|---|
| 4,456,084 | 6/1984 | Miller | 177/141 |
| 4,588,038 | 5/1986 | Takagi | 177/141 |
| 4,651,838 | 3/1987 | Hamilton et al. | 177/209 |
| 4,789,038 | 12/1988 | Nguyen et al. | 180/24.02 |
| 4,815,547 | 3/1989 | Dillon et al. | 177/25.14 |
| 4,832,141 | 5/1989 | Perini et al. | 177/141 |
| 4,852,674 | 8/1989 | Gudat | 177/141 |
| 5,110,153 | 5/1992 | Kallansrude et al. | 283/707 |
| 5,119,895 | 6/1992 | Gradert | 177/208 |
| 5,131,482 | 7/1992 | Davis et al. | 177/25.14 |
| 5,167,289 | 12/1992 | Stevenson | 177/141 |
| 5,182,712 | 1/1993 | Kyrtsos et al. | 177/141 X |
| 5,410,109 | 4/1995 | Tarter et al. | 177/136 |
| 5,478,974 | 12/1995 | O'Dea | 177/136 X |
| 5,623,128 | 4/1997 | Grimm et al. | 177/25.13 |

*Primary Examiner*—Michael L. Gellner
*Assistant Examiner*—Randy W. Gibson
*Attorney, Agent, or Firm*—Zarley, McKee, Thomte, Voorhees & Sease

[57] ABSTRACT

A vehicle load weighing system of the present invention is used to display the weight of a load on a vehicle from within the cab of the vehicle. The system includes a number of air pressure sensors which sense the air pressure in the air bladders mounted between the frame and axle of a trailer. The air pressure sensors include a processor for converting the measured air pressure into a weight value. The weight values from the sensor units are received and displayed by the display unit in the cab of the vehicle. The display unit can be used with any type of sensor module regardless of the type of air bladder sensed since the sensors send generic weight data rather than air pressure data.

16 Claims, 5 Drawing Sheets

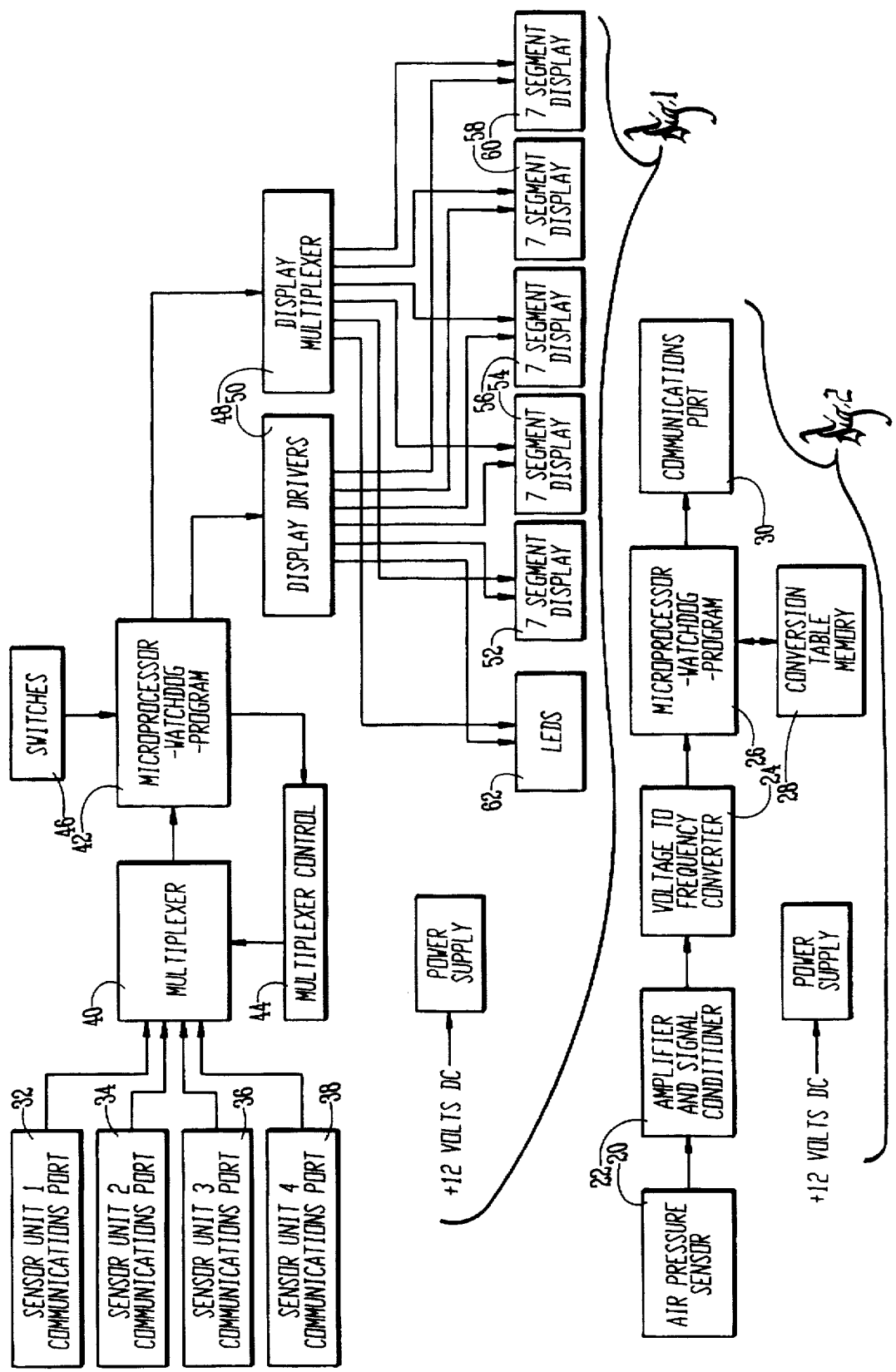

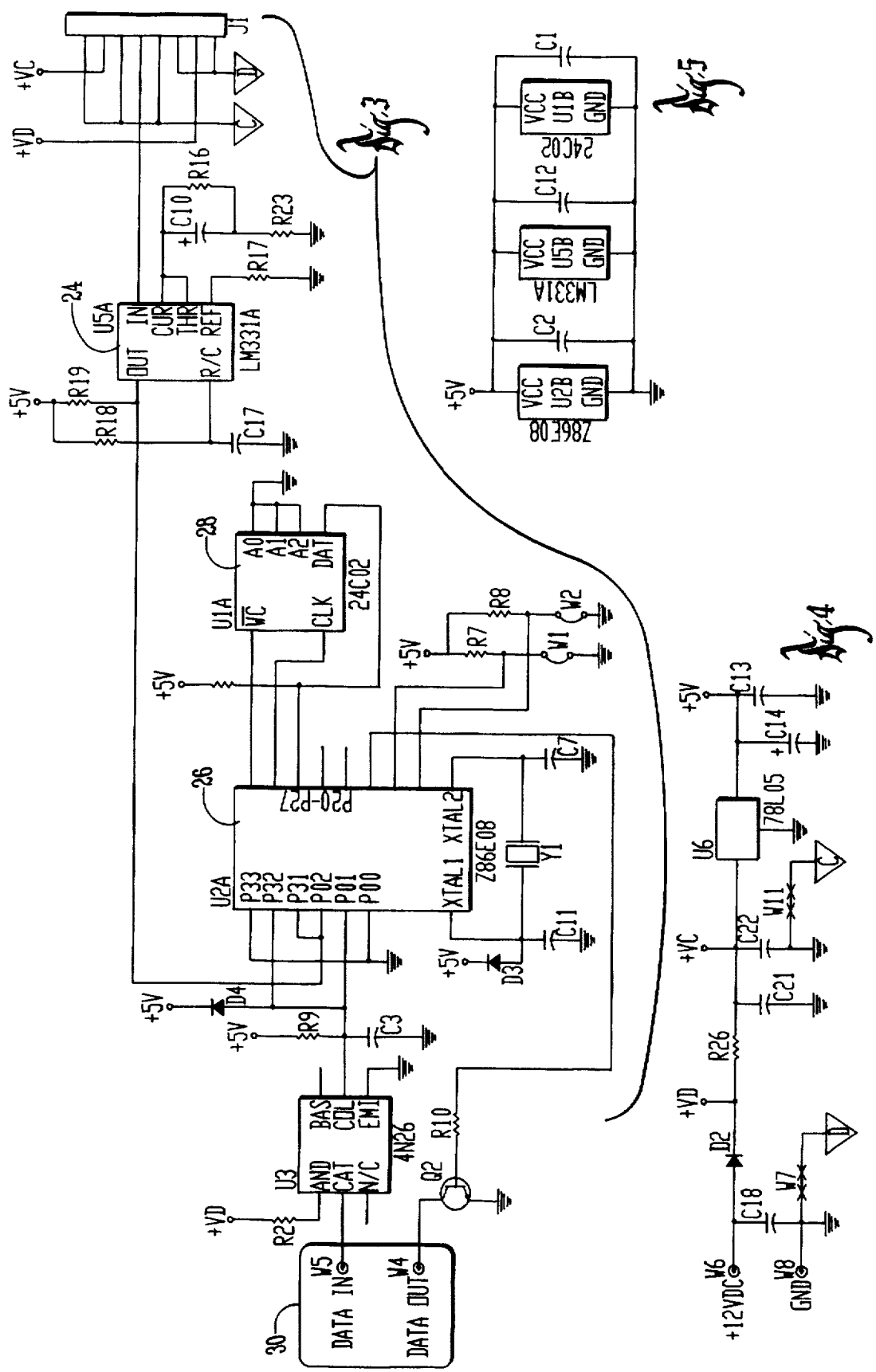

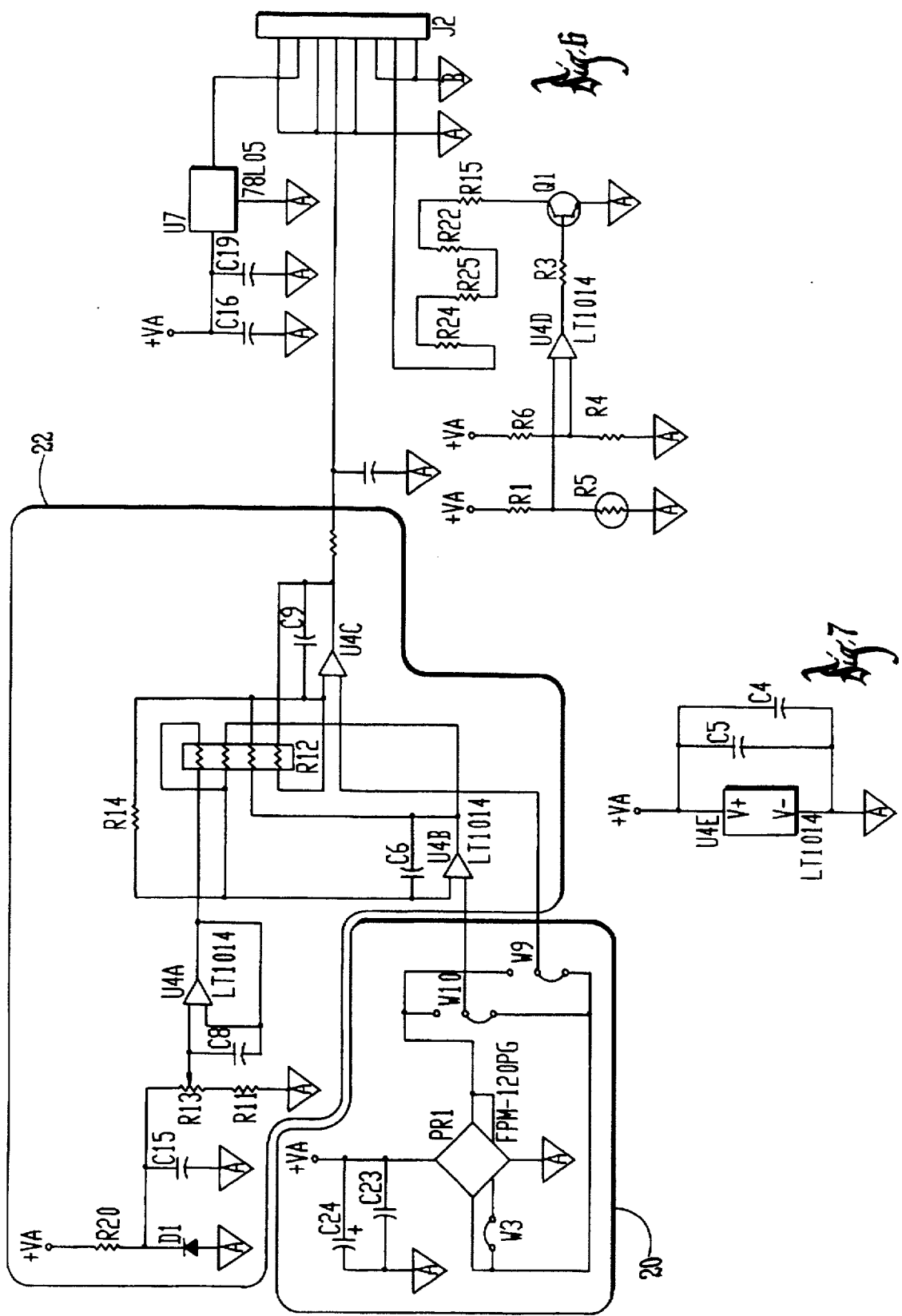

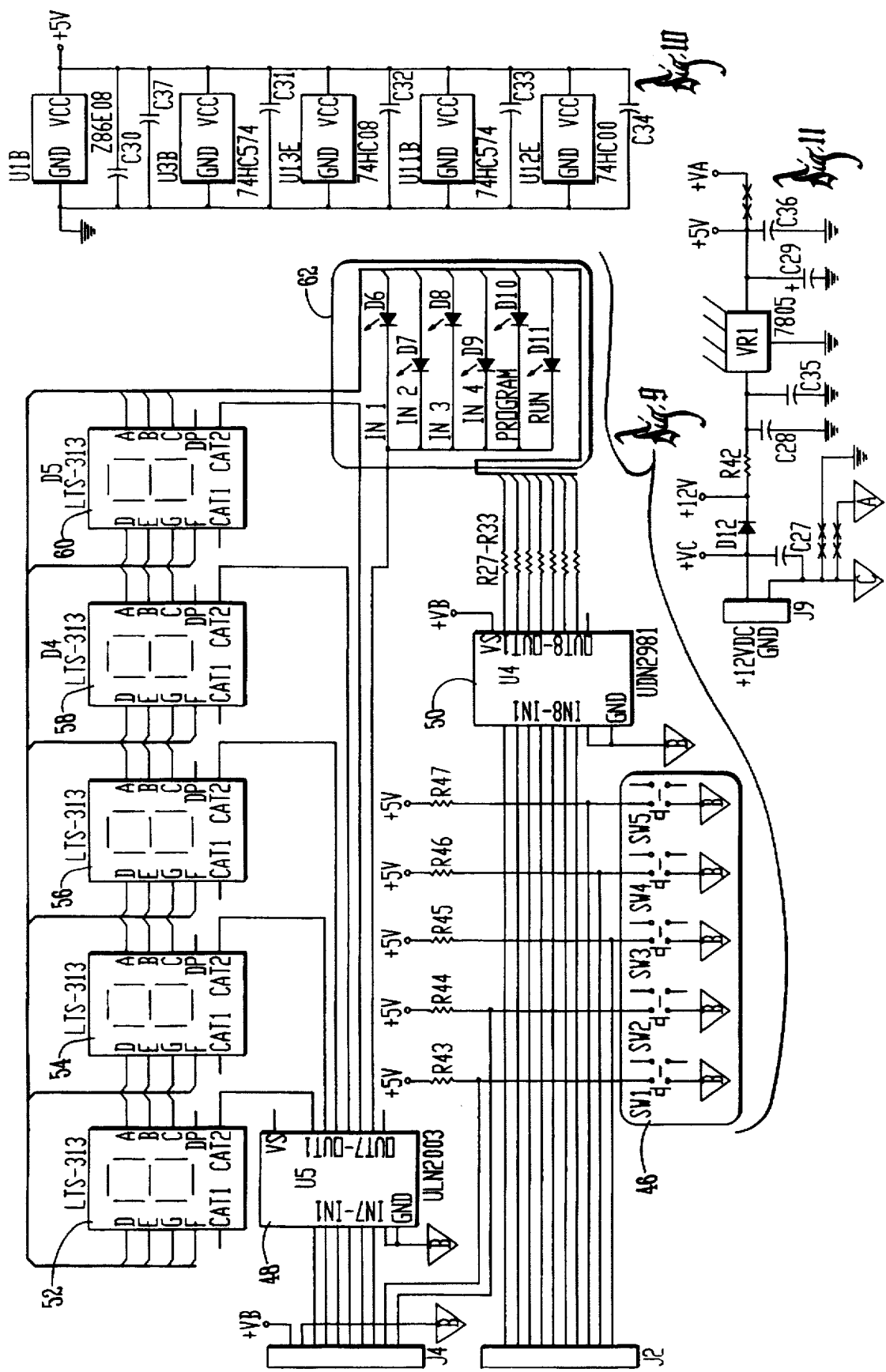

VEHICLE LOAD WEIGHING SYSTEM

BACKGROUND OF THE INVENTION

1. Field of the Invention

The present invention relates to a system for weighing the load on a vehicle. More particularly, the present invention relates to a system for weighing the load on a vehicle using a measurement of the air pressure in a number of pressure bladders positioned between the frame and the axle of the vehicle.

2. Problems in the Art

When hauling cargo in a commercial vehicle, it is necessary to know the weight of the cargo in the vehicle. It is therefore desired to have systems which can easily and accurately determine the weight of cargo in a load.

The cost to a customer for shipping cargo is determined by the weight of the cargo and the distance traveled. It is therefore important to know the exact weight of cargo. When shipments to various destinations are included in the same load, it is also necessary to know the weight of each portion of the load. As a result, the efficiency and accuracy of a cargo weighing system has a great effect on the amount of time spent by the shipper, and the cost to ship goods.

It is also important when shipping goods by truck to not overload or underload the truck. An underloaded truck results in inefficient transportation of cargo. An overloaded truck may result in a fine, and also is a big factor in the deterioration of highways.

Various systems exist for determining the weight of a load on a vehicle. The most common systems in use are fixed scales which are usually present at the points of loading and unloading, and at weigh stations along the way. Other systems are on-board the trucks themselves and use position sensors to measure the vertical displacement between the body and axle of a vehicle. Other systems measure the hydraulic pressure in the struts of the vehicle to estimate the weight. Other prior art systems measure the air pressure in an air suspension system.

These various prior art systems have several disadvantages including the complexity of the systems, the cost of implementing the systems, and the inaccuracy of the systems. When relying on fixed scales, the shipper of cargo must rely on other parties to provide weighing facilities and weighing calculations. This results in an increase in the time of shipment and an increase in the cost. This can also result in erroneous weights and therefore inaccurate calculations of freight charges.

One disadvantage of prior art on-board weighing systems is that the systems are unique for each trailer/truck combination. For example, if a truck unhitched one type of trailer and hitched up a second type of trailer, the on-board weighing systems would have to be changed or recalibrated. This problem occurs because the controller or display unit in the truck cab is set up to work with one particular trailer at a time, rather than with any type of trailer.

It would be desirable to have a simple, accurate, on-board weighing system that works easily regardless of the type of trailer used at any particular time without resetting or recalibrating the control unit.

FEATURES OF THE INVENTION

A general feature of the present invention is the provision of a system for measuring the weight of the load on a vehicle.

A further feature of the present invention is the provision of a system for measuring the weight of a load on a vehicle which uses the air pressure of the pressure bladders of the vehicle support system to determine the weight of the load.

A further feature of the present invention is the provision of a system for measuring the weight of a load on a vehicle wherein each pressure sensor independently determines a weight based on the measured pressure and sends a weight signal to the main display unit in the cab of the truck.

A further feature of the present invention is a system for measuring the weight of a load on a vehicle in which the display unit/processor in the cab of the truck is compatible with the pressure sensors installed on various trailers with various sized pressure bladders without recalibrating or resetting the display unit.

An optional feature of the present invention is the provision of a system for measuring the weight of a load on a vehicle that uses four different pressure sensors to determine the weight of the load.

An optional feature of the present invention is the provision of a system for measuring the weight of a load on a vehicle that includes a display unit in the cab of the truck that selectively displays the weights measured at each sensor.

An optional feature of the present invention is a system for measuring the weight of a load on a vehicle which allows the user to reprogram or recalibrate each pressure sensor from the cab of the truck via the display unit.

An optional feature of the present invention is a system for measuring the weight of a load on a vehicle with a communication system between the pressure sensors and the display unit that is optically isolated for improved noise immunity.

An optional feature of the present invention is a system for measuring the weight of a load on a vehicle which has a display unit/processor which is not required to have memory for storing data related to pressure to weight tables.

An optional feature of the present invention is a system for measuring the weight of a load on a vehicle which uses air pressure sensors consisting of piezoelectric transducers to measure the air pressure in the pressure bladders.

An optional feature of the present invention is a system for measuring the weight of a load on a vehicle which includes a means for heating the pressure sensor transducer when the ambient temperature falls below the transducer's normal operating range.

These as well as other features of the present invention will become apparent from the following specification and claims.

SUMMARY OF THE INVENTION

The vehicle load weighing system of the present invention is used to provide the user of the vehicle with a display showing the weight of the load in the vehicle. The system uses at least one pressure sensor unit to sense the air pressure in the air bladders that are mounted between the frame and axle of the vehicle. The sensor module includes a processor which converts the measured pressure into weight data. A display and processing unit is located within the cab for displaying the weight data received from the sensor modules. The user can selectively display data from any of the pressure sensor modules.

Since the sensor modules convert the sensed air pressure into weight data, the display unit receives a generic weight data signal regardless of the type of air bladder sensed. As a result, the display unit can be used with any type of sensor module sensing any type of air bladder since the display unit itself does not need to convert air pressure data to weight data.

BRIEF DESCRIPTION OF THE DRAWINGS

FIG. 1 is a block diagram of the pressure sensor display unit.

FIG. 2 is a block diagram of one air pressure sensor module and its related components.

FIG. 3 is a schematic diagram of part of the pressure sensor circuit corresponding to the voltage to frequency converter, microprocessor, conversion table memory, and communications port shown in FIG. 2.

FIGS. 4, 5, and 7 are schematic diagrams of the power supply circuits for one pressure sensor module corresponding to the power supply shown in FIG. 2.

FIG. 6 is a schematic diagram of a portion of the pressure sensor circuit corresponding to the air pressure sensor and the amplifier and signal conditioner shown in FIG. 2.

FIG. 9 is a schematic diagram of the part of the pressure display unit corresponding to the switches, display drivers, display multiplexer, LED's, and segment displays shown in FIG. 1.

FIGS. 10 and 11 are the power supply circuits for the pressure display unit corresponding to the power supply shown in FIG. 1.

DETAILED DESCRIPTION OF THE PREFERRED EMBODIMENT

Figure 8:
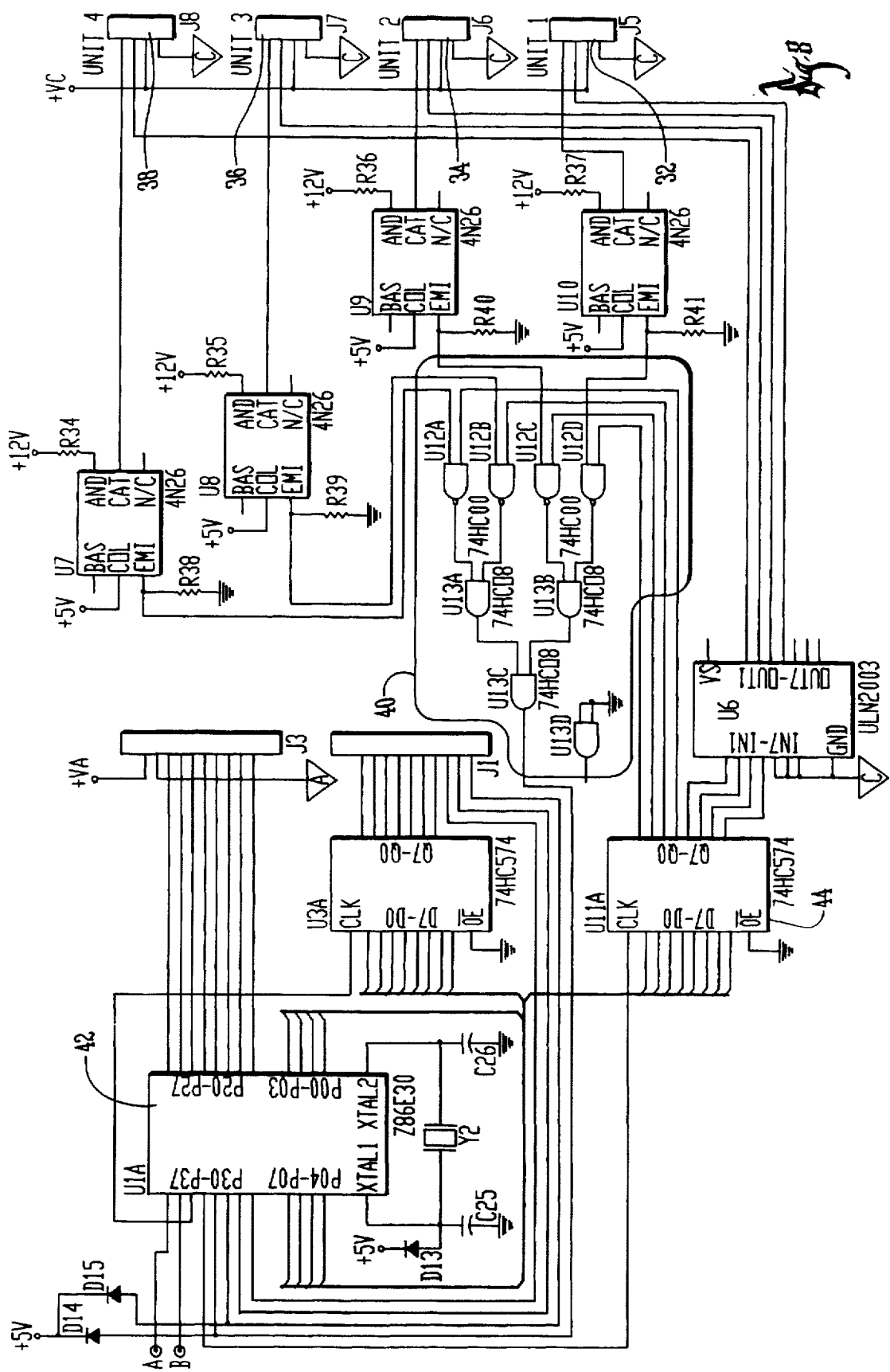
FIG. 8 is a schematic diagram of a portion of the pressure display unit including the communication ports, multiplexer, multiplexer control, and processor shown in FIG. 1.

The present invention will be described as it applies to its preferred embodiment. It is not intended that the present invention be limited to the described embodiment. It is intended that the invention cover all alternatives, modifications, and equivalences which may be included within the spirit and scope of the invention.

FIGS. 1 and 2 show block diagrams of one embodiment of the present invention. The load display unit shown in FIG. 1 is designed to interface with four separate pressure sensor modules like that shown in FIG. 2. Each air pressure module includes an air pressure sensor which senses the air pressure of a pressure bladder mounted between the frame and axle of a trailer. The pressure sensor is capable of measuring air pressures between 0 to 200 psi. The pressure display unit includes a processor which receives weight data from each pressure sensor module and displays a value of the weight loaded on the trailer.

FIG. 2 is a block diagram of a single pressure sensor unit. Each pressure sensor unit includes a pressure sensor 20, an amplifier and signal conditioner 22, a voltage to frequency converter 24, a microprocessor 26, memory 28, and a communications port 30.

FIG. 1 is a block diagram of the pressure sensor display unit. The display unit includes four communication ports 32, 34, 36, 38, each connected to the communications port 30 of one of the pressure sensor modules. The communication ports 32, 34, 36 and 38 are also connected to the multiplexer 40. FIG. 1 also shows the pressure sensor display unit microprocessor 42, a multiplexer control 44, control switches 46, display multiplexer 48, display drivers 50, displays 52, 54, 56, 58, and 60, and light emitting diodes (LED's) 62.

Pressure Sensor Modules

As shown in FIG. 6, the pressure sensor 20 of FIG. 2 is comprised of a pressure transducer PR1 and its related components which are adapted to sense the air pressure in one of the air bladders of the trailer. The sensor PR1 generates a voltage corresponding to the sensed air pressure in the bladder. The voltage is amplified and conditioned by the amplifier and signal conditioner 22 comprised of U4 and its related discrete components shown in FIG. 6. Amplifier and signal conditioner 22 also contains a voltage offset input to allow for sensor offset trimming. The amplified and conditioned signal is then sent to a voltage to frequency converter 24 which is comprised of U5A shown in FIG. 3. The voltage to frequency converter 24 converts the signal to a 10–60 kHz squarewave signal which can be read by the microprocessor 26. The microprocessor 26 is comprised of U2A shown in FIG. 3. The microprocessor 26 is connected to a conversion table memory 28 which is comprised of EEPROM U1A shown in FIG. 3. Memory 28 stores a single conversion table for the particular air bladder that the pressure sensor module is connected to. The processor 26 uses the squarewave signal and the conversion table stored in Memory 28 to create a signal corresponding to a certain weight value. This weight signal is sent to the DATA OUT terminal of the communications port 30. Each pressure sensor unit communications port 30 is connected to its corresponding communication port 32, 34, 36, or 38 of the pressure display unit.

As shown in FIG. 6, four two watt resistors, R15, R22, R24 and R25 are optionally included with the pressure sensor module. The resistors surround the pressure sensor device PR1 and are activated using a 10° C. thermistor R5 mounted near the sensor device PR1. When the temperature of the module drops to 10° C., an operational amplifier U4D acting as a comparitor, enables current flow through the resistors R15, R22, R24, R25. The current through the resistors creates heat which heats the sensor PR1 which allows the sensor module to operate below the specified temperatures of sensor PR1.

Display Unit

Communication ports 32, 34, 36, and 38 of the display unit are comprised of J5, J6, J7 and J8 respectively shown in FIG. 8. Each weight signal received from the pressure sensor modules is received by one of optoisolators U7, U8, U9 and U10 and sent to multiplexer 40 which is comprised of U12 and U13 shown in FIG. 8. The output of the multiplexer 40 is connected to the microprocessor 42. The microprocessor 42 processes the received weight data and ultimately displays the data to the user. The microprocessor 42 is connected to a display driver 50 and display multiplexer 48 (FIG. 9). The display driver 50 is connected to each of the seven segment displays 52, 54, 56, 58 and 60. Each seven segment display is also connected to the display multiplexer 48 which is comprised of U5 shown in FIG. 9. The display driver 50 and multiplexer 48 are both connected to LED's 62 shown as LED's D6–D11 in FIG. 9. LED's D6–D11 correspond to the functions IN1, IN2, IN3, IN4, PROGRAM, and RUN respectively.

The display unit also consists of switches 46 which are comprised of five push button switches SW1–SW5. Switches SW1–SW5 correspond to the functions "axle select", "program", "increment", "decrement", and "enter", respectively.

The various power supply circuits shown in FIGS. 4, 5, 7, 10 and 11 are used to provide voltage sources to the pressure sensor modules and display unit circuit.

Operation

Since the air bladders described above are non-linear and vary unit to unit, the pressure sensor modules are designed to accept up to 50 separate programming points to allow for bladder linearization by inputting actual weight loads onto the trailer and entering these weights into the modules permanent memory. The pressure sensor module will also enter the associated pressure at this time. A minimum of two programming points must be entered for proper system measuring operation. As more pressure points are entered, the accuracy of the bladder system increases. Any type linearity curve can be programmed into the display unit by factory personnel using switches SW1-SW5. This will allow for auto calibration to any type of pressure bladder.

When power is applied to the display unit, the LED's corresponding to "axle 1" and "run" are turned on and the display unit displays the current extrapolated weight which pressure module unit 1 is measuring from the bladder air pressure. This information is updated every half second. As the "axle select" switch SW1 is pressed, the display will move through each axle weight 1-4.

The display unit is based on microprocessor 42 which is preferably the Zilog Z86E30 microprocessor. Microprocessor 42 performs all serial communications, keyboard scanning, and display and LED multiplexing. Microprocessor 42 also contains the necessary EPROM program, RAM temporary storage, time base timers and watchdog for proper program operation. Microprocessor 42 also acts as the "master" during communications with all "slave" modules. The master initiates all communications with the slave and expects information or acknowledgment in return.

Each pressure sensor module is based on the microprocessor 26 which is preferably comprised of the Zilog Z86E08 microprocessor. Microprocessor 26 performs the serial communications, EEPROM permanent memory programming, and pressure sensor monitoring. Microprocessor 26 also contains the necessary EPROM program, RAM temporary storage, time based timers, and watchdog for proper program operation.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

TABLE 1

| ITEM | DESCRIPTION | VALUE or PART NUMBER |
| --- | --- | --- |
| R1 | Resistor | 10K Ohms |
| R2 | Resistor | 1.2K Ohms |
| R3 | Resistor | 470 Ohms |
| R4 | Resistor | 20K Ohms |
| R5 | Thermistor | 10K3A2 10K NOM |
| R6-R8 | Resistor | 10K Ohms |
| R9 | Resistor | 1K Ohms |
| R10 | Resistor | 470 Ohms |
| R11 | Resistor | 820 Ohms |
| R12 | Resistor | 10K Ohms |
| R13 | Potentiometer | 100 Ohms 20T |
| R14 | Resistor | 2.74K Ohms |
| R15 | Resistor | 12 Ohms 2W |
| R16 | Resistor | 100K Ohms |
| R17 | Resistor | 20K Ohms |
| R18 | Resistor | 6.81K Ohms |
| R19 | Resistor | 10K Ohms |
| R20 | Resistor | 1K Ohms |
| R21 | Resistor | 100K Ohm |
| R22 | Resistor | 12 Ohms 2W |
| R23 | Resistor | 47 Ohms |
| R24 | Resistor | 12 Ohms 2W |
| R25 | Resistor | 12 Ohms 2W |

TABLE 1-continued

| ITEM | DESCRIPTION | VALUE or PART NUMBER |
| --- | --- | --- |
| R26 | Resistor | 47 Ohms |
| R27-R33 | Resistor | 51 Ohms |
| R34-R37 | Resistor | 1.2K Ohms |
| R38-R41 | Resistor | 4.7K Ohms |
| R42 | Resistor | 20 Ohms 3W |
| R43-R47 | Resistor | 10K Ohms |
| C1-C3 | Capacitor | 0.1 µF |
| C4 | Capacitor | 1 µF |
| C5 | Capacitor | 0.1 µF |
| C6 | Capacitor | 10 pF |
| C7 | Capacitor | 27 pF |
| C8 | Capacitor | 10 pF |
| C9 | Capacitor | 10 pF |
| C10 | Capacitor | 1 µF |
| C11 | Capacitor | 27 pF |
| C12 | Capacitor | 0.1 µF |
| C13 | Capacitor | 0.1 µF |
| C14 | Capacitor | 1 µF |
| C15 | Capacitor | 0.1 µF |
| C16 | Capacitor | 0.1 µF |
| C17 | Capacitor | 0.001 µF |
| C18 | Capacitor | 0.1 µF |
| C19 | Capacitor | 1 µF |
| C20 | Capacitor | 1 µF |
| C21 | Capacitor | 0.1 µF |
| C22 | Capacitor | 1 µF |
| C23 | Capacitor | 0.1 µF |
| C24 | Capacitor | 1 µF |
| C25-C26 | Capacitor | 27 pF |
| C27-C34 | Capacitor | 0.1 µF |
| C35-C37 | Capacitor | 10 µF |
| D1 | Diode | ILC8069 |
| D2 | Diode | IN4004 |
| D3 | Diode | IN4148 |
| D4 | Diode | IN4148 |
| D6-D11 | LED | RED LED |
| D12 | Diode | 1N4004 |
| D13-D15 | Diode | 1N4148 |
| Q1-Q2 | Transistor | 2N3904 |
| Y1 | Oscillator | 8 MHz |
| Y2 | Oscillator | 8 MHz |

What is claimed is:

1. A weight sensing system for a vehicle having an air bladder support system mounted between the frame and axle of the vehicle comprising:
   at least one pressure sensor unit, said pressure sensor unit further comprising:
      an air pressure sensor for sensing the air pressure in at least one air bladder of the air bladder support system, and
      a first processor connected to the pressure sensor, the first processor having access to weight conversion data for the air bladder being sensed for converting the sensed air pressure in the air bladder into generic weight data;
   a display unit operatively connected to the at least one pressure sensor unit, said display unit further comprising:
      a second processor for receiving and processing the generic weight data from the at least one pressure sensor unit,
      a display connected to the second processor; and
   wherein said display unit displays information to give an indication of the weight of a load on the vehicle.

2. The system of claim 1 wherein the at least one pressure sensor unit includes memory for storing a conversion table having weight values corresponding to air pressure values for the particular pressure bladder sensed.

3. The system of claim 1 wherein the at least one pressure sensor unit is located on a trailer proximate the air bladder which it senses and the display unit is located in the cab of the vehicle.

4. The system of claim 1 wherein the system includes a plurality of pressure sensor units.

5. The system of claim 4 wherein the display unit selectively displays the weight data from any of the sensor units.

6. The system of claim 1 wherein the pressure sensor is comprised of a piezoelectric transducer.

7. The system of claim 1 further comprising a heating element located in the proximity of the air pressure sensor for heating the air pressure sensor.

8. The system of claim 7 wherein the heating element comprises a plurality of resistors surrounding the air pressure sensor.

9. The system of claim 7 further comprising a comparitor for causing current to flow through the heating element when the ambient temperature falls below a threshold temperature.

10. A method of measuring the weight of a load on a vehicle having an air bladder support system comprising the steps of:

providing a pressure transducer for sensing the air pressure in a first air bladder;

monitoring the ambient temperature in the proximity of the pressure transducer;

heating the pressure transducer if the ambient temperature falls below a certain temperature;

sensing the air pressure in the first air bladder;

providing a processor for the first air bladder;

using the processor to convert the sensed air pressure into generic weight data;

providing a display unit on the vehicle;

sending the weight data to the display unit; and displaying information based on the weight data to provide an indication of the weight of the load on the vehicle.

11. The method of claim 10 further comprising the step of:

sensing the air pressure in a plurality of air bladders.

12. The method of claim 11 further comprising the step of selectively displaying the weight value from any of the air bladders.

13. The method of claim 10 further comprising the steps of:

monitoring the ambient temperature in the proximity of the pressure transducer; and compensating for a change in temperature.

14. A method of displaying weight information in a truck relating to the weight of a load on a trailer having an air bladder support system comprising the steps of:

providing an air pressure sensor for a first air bladder;

determining the temperature in the proximity of the air pressure sensor;

heating the air pressure sensor if the determined temperature falls below a threshold temperature;

sensing the air pressure of the first air bladder;

providing a first sensor processor on the trailer, the first sensor processor being operatively connected to the air pressure sensor;

providing a memory location operatively connected to the first sensor processor;

storing weight conversion data for the first air bladder in the memory location;

converting the sensed air pressure of the first air bladder to weight data using the stored weight conversion; and sending the weight data to a weight display unit.

15. The method of claim 14 further comprising the steps of:

unhitching the trailer from the truck;

hitching a second trailer to the truck;

providing a second air pressure sensor for a second air bladder located on the second trailer;

sensing the air pressure of the second air bladder;

providing a second sensor processor on the second trailer, the second sensor processor being operatively connected to the second air pressure sensor;

providing a second memory location operatively connected to the second sensor processor;

storing weight conversion data for the second air bladder in the second memory location;

converting the sensed air pressure of the second air bladder to weight data using the stored weight conversion from the second memory location; and sending the weight data from to the truck for use by the weight display unit.

16. A method of displaying weight information in a truck relating to the weight of a load on a trailer having an air bladder support system comprising the steps of:

providing an air pressure sensor for a first air bladder;

sensing the air pressure of the first air bladder;

providing a first sensor processor on the trailer, the first sensor processor being operatively connected to the air pressure sensor;

providing a memory location operatively connected to the first sensor processor;

storing weight conversion data for the first air bladder in the memory location;

converting the sensed air pressure of the first air bladder to weight data using the stored weight conversion;

providing a second air pressure sensor for a second air bladder;

sensing the air pressure of the second air bladder;

providing a second sensor processor on the trailer, the second sensor processor being operatively connected to the second air pressure sensor;

providing a second memory location operatively connected to the second sensor processor;

storing weight conversion data for the second air bladder in the second memory location;

converting the sensed air pressure of the second air bladder to weight data using the stored weight conversion for the second air bladder;

sending the weight data for the first and second air bladders to a weight display unit.

* * * * *